Patented June 29, 1937

2,085,251

UNITED STATES PATENT OFFICE 2,085,251

METHOD OF MAKING GLASSES RESISTANT TO ALKALI METAL VAPORS

Robert H. Dalton, Corning, N. Y., assignor to Corning Glass Works, Corning, N. Y., a corporation of New York No Drawing. Application November 6, 1934
Serial No. 751,792

3 Claims. (Cl. 91—70)

This invention relates to glasses which are resistant to discoloration by hot alkali metal vapors and has for its object to impart resistance to normally non-resistant glasses.

Ordinary glasses are subject to a rapid discoloration of their surface when heated to 250° C. to 350° C., or higher, in contact with alkali metal vapors, as for example, in the sodium vapor arc lamp. Such discoloration greatly decreases the luminosity of the lamp and has been the chief obstacle to the successful development of this efficient light source. It has generally been considered that this discoloration is in some manner dependent upon a high silica content in the glass whereby the sodium causes reduction of some of the silica to metallic silicon. Various glasses of abnormally low silica content have been proposed as envelopes for such lamps to overcome the difficulty. These special glasses possess undesirable characteristics, particularly with respect to chemical stability and softness, which not only makes difficult the fabrication of tubes, bulbs and the like therefrom, by ordinary glass working methods, but also renders such articles easily susceptible to atmospheric attack. It has further been proposed to cover and protect these special glasses against atmospheric attack by flashing them onto the inside of ordinary stable glasses, but their working properties are so different from normal glasses that the results have been unsatisfactory.

I have discovered that ordinary stable glasses which are normally discolored by contact with hot alkali metal vapors may be rendered resistant to such discoloration by coating them with a fused-on film of an alkali compound and that such films are usually transparent and when applied in sufficiently thin layers do not craze or peel when the glass is subjected to thermal change.

Protecting films made in accordance with my invention may be prepared by treating the surface of the glass which is to be exposed to the action of alkali metal vapors with a substance which on being heated will fuse to give a thin uniform layer of alkali compound over the surface of the glass.

In preparing such films I preferably proceed as follows: The glass surface is wet by means of a finely atomized spray or mist of a 10–20% aqueous solution of sodium hydroxide, or sodium carbonate. Other solvents may be used in lieu of water. At the same time the glass is heated to a temperature just high enough to cause the mist to dry rapidly on the glass leaving the deposited salt in a uniform layer. The glass surface may also be wet by merely rinsing it with the solution and the film of solution remaining thereon is then dried uniformly by means of a jet of dry hot air. The glass with its dry coating is then heated, preferably in an electric muffle at about 600° C., or as hot as possible without deforming the glass for about an hour or a time sufficient to fuse the alkali compound into the glass surface. Bulbs treated in this manner may be heated for fifteen hours at 300° C. in contact with saturated sodium vapor without appreciable discoloration.

The thickness of the coating may be increased by increasing the concentration of the salt solution and/or by prolonging the exposure of the warm glass to the mist thereof, but if too thick the coating is liable to crack or craze on account of the difference between its expansion coefficient and that of the glass and, also, is liable to become quite hygroscopic. I have been unable to obtain an exact measurement of the thickness of my films because in most articles which I have examined microscopically the film merges with the glass and it is difficult to see any sharp line of demarcation between the film and the glass. However, the proper thickness may readily be obtained by trial.

It is uncertain whether or not the protective layer thus produced consists entirely of the original alkali compound which was used to make the coating. The firing process will undoubtedly bring about a change in the composition. This change may comprise a decomposition of the alkali compound itself or a reaction thereof with the air or the moisture in the air or it may include a reaction with the constituents of the glass.

Although in preparing my protecting coating I prefer to use sodium hydroxide or sodium carbonate as the alkali compound, I have also used a variety of other alkali compounds, such as potassium iodide, sodium nitrate, sodium phosphate, lithium hydroxide, potassium hydroxide, etc., all of which produce some of the benefits of my invention. I am, therefore, convinced that compounds of the other alkali metals, namely, rubidium and cesium, will also produce some of the benefits of my invention and will fall within the scope of the appended claims.

In the claims I use the term "alkali compound" not only to refer to the salt before its application to the glass but also to define the film on the glass when finished. Films of alkali compound, prepared in accordance with my invention, are not seriously affected by atmospheric moisture, but in fabricating a lamp from a bulb so coated on its interior, it is desirable to direct the flame of the burner away from the interior of the bulb and to keep all parts of the bulb as warm as possible to avoid condensation.

While in the foregoing there has been shown and described the preferred embodiment of my invention, it is to be understood that minor changes in the details of construction, combination and arrangement of parts may be resorted to without departing from the spirit and scope of the invention as claimed.

Having thus described my invention, what I claim is:

1. The method of treating glass to make it resistant to discoloration by hot alkali metal vapors, which includes wetting the surface of the glass with a solution consisting of an alkali compound and a solvent, and heating the glass to fuse the alkali compound to the glass in a homogeneously attached substantially transparent layer which is thick enough to prevent discoloration of the glass by the alkali metal vapor and then enough to resist cracking and crazing.

2. The method of treating glass to make it resistant to discoloration by hot alkali metal vapors, which includes wetting the surface of the glass with a solution consisting of sodium hydroxide and a solvent, drying the wet film uniformly and heating the glass to fuse the alkali thereto in a substantially transparent layer which is thick enough to prevent discoloration of the glass by the alkali metal vapor and thin enough to resist cracking and crazing.

3. The method of treating glass to make it resistant to discoloration by hot alkali metal vapors, which includes wetting the surface of the glass with a solution consisting of sodium carbonate and a solvent, drying the wet film uniformly, and heating the glass to fuse the alkali thereto in a substantially transparent layer which is thick enough to prevent discoloration of the glass by the alkali-metal vapor and thin enough to resist cracking and crazing.

ROBERT H. DALTON.